Figure 1:
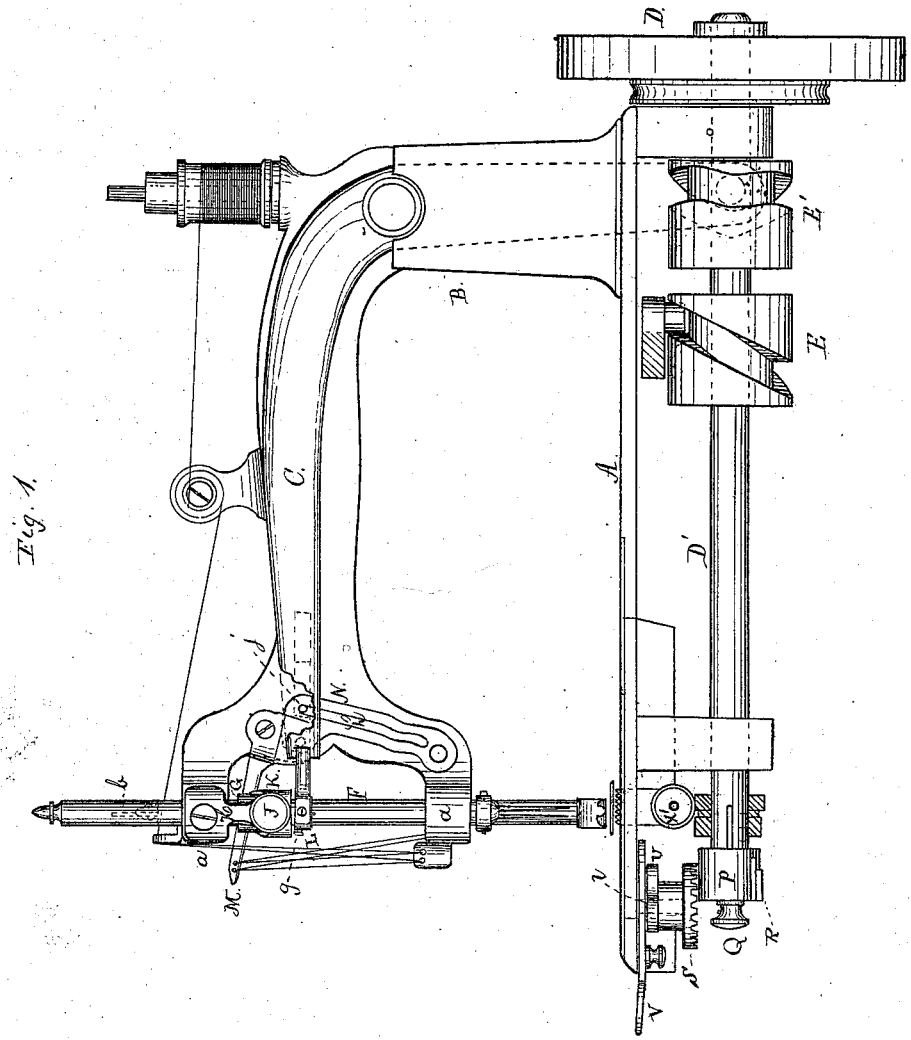

5 Sheets--Sheet 1.

E. A. GOODES.
Sewing-Machines.

No. 136,718.  Patented March 11, 1873.

Witnesses:
Jacob E. Schiedt
[signature]

Inventor:
Ebenezer A. Goodes
by [signature]
atty.

AM. PHOTO-LITHOGRAPHIC CO. N.Y. (OSBORNE'S PROCESS.)

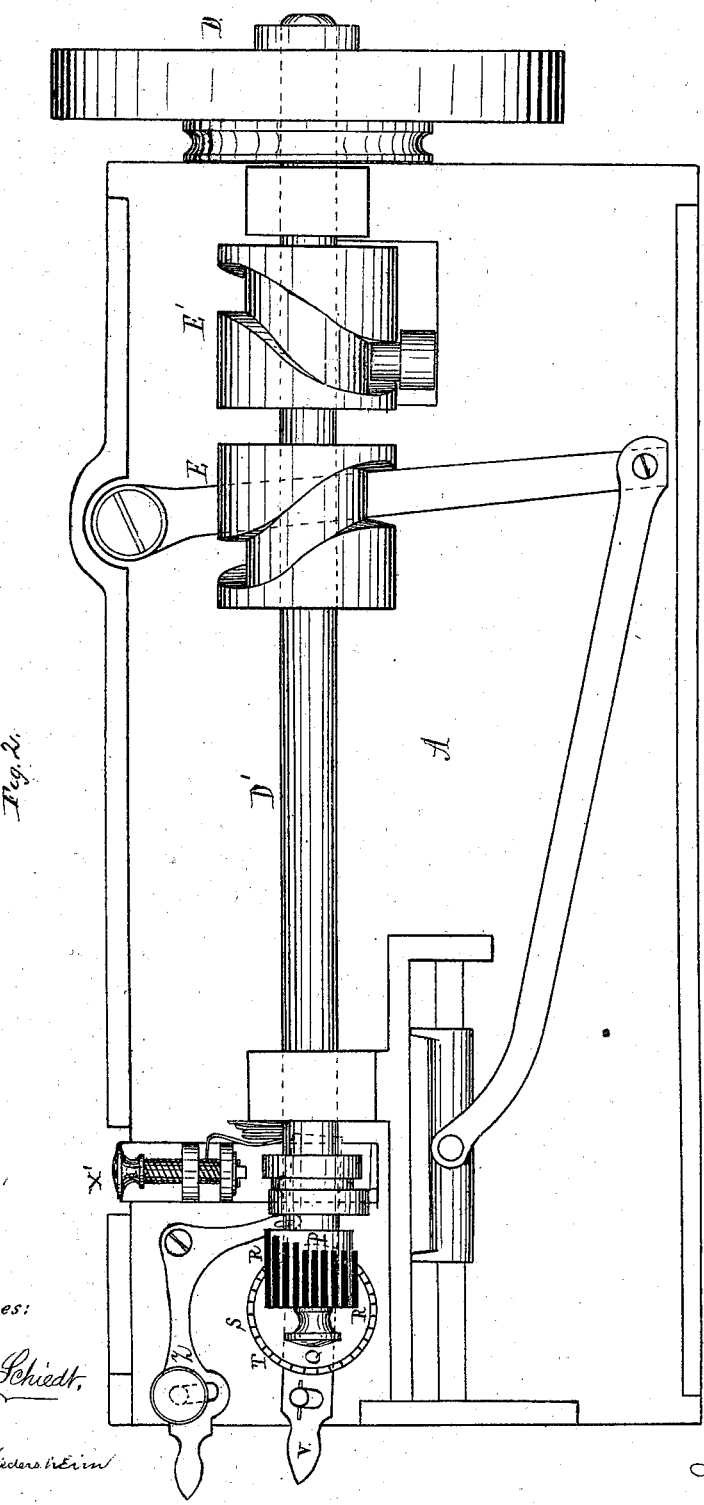

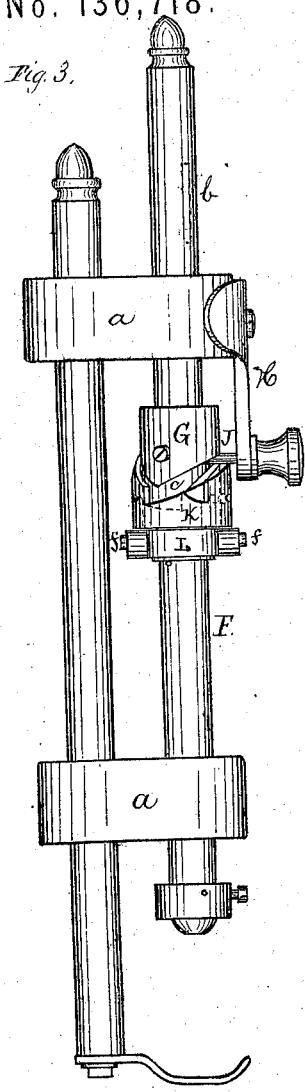
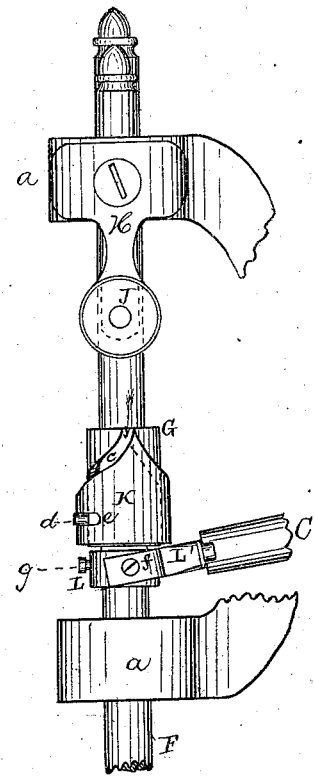
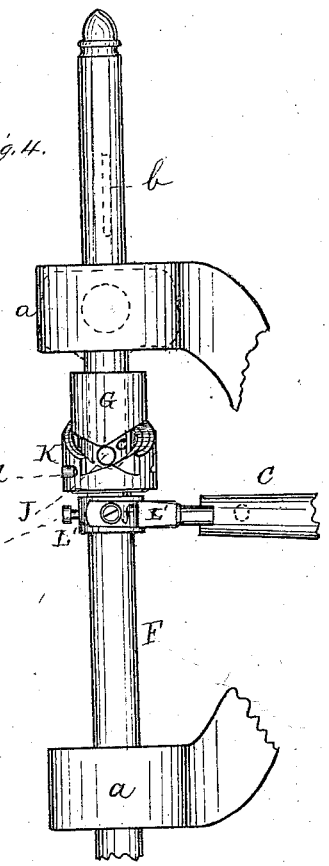
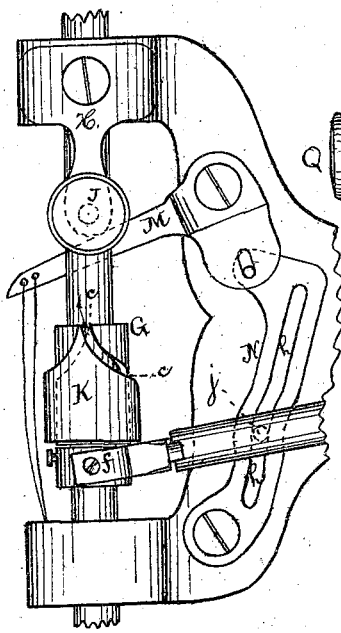

5 Sheets--Sheet 4.
E. A. GOODES.
Sewing-Machines.
No. 136,718.   Patented March 11, 1873.
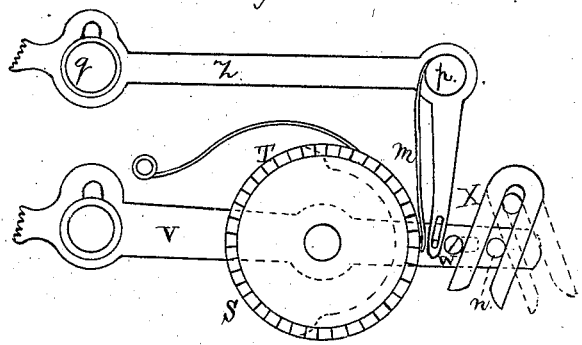
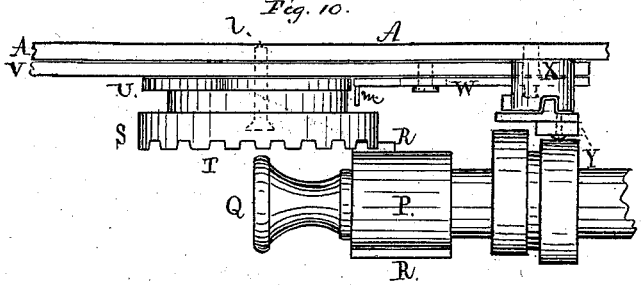
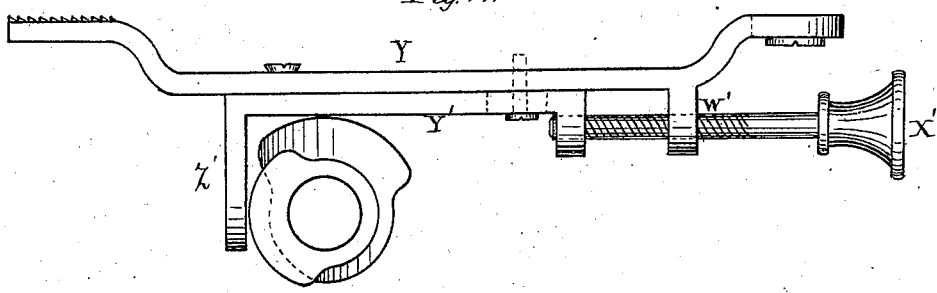
Witnesses:
Jacob E. Schiedt
Harry M. Wiedersheim
Inventor:
Ebenezer A. Goodes
by Joshua A. Wiedersheim
Atty E. A. GOODES.
Sewing-Machines.
No. 136,718.
Patented March 11, 1873.
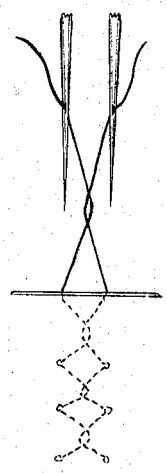 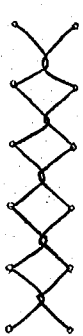 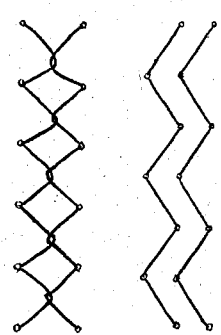 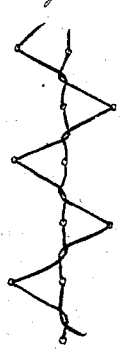 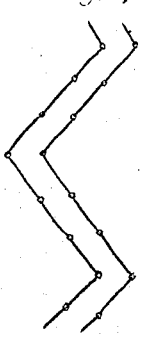
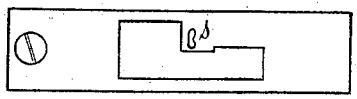
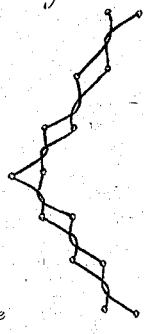 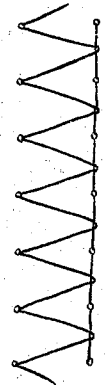 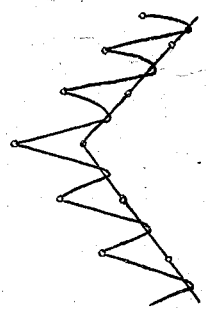 
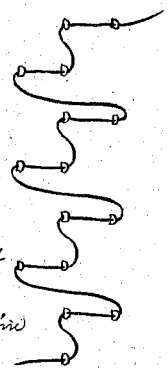 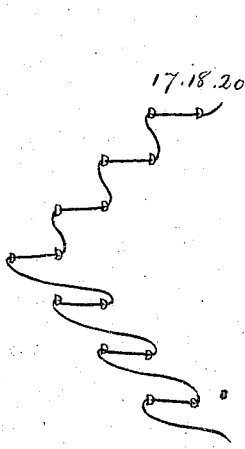 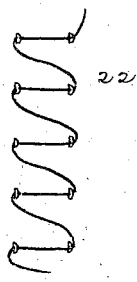
Witnesses:
Jacob E. Schiedt
Harry M. Wiedersheim
Inventor:
Ebenezer A. Goodes,
by John A. Wiedersheim
Atty.

UNITED STATES PATENT OFFICE.

EBENEZER A. GOODES, OF PHILADELPHIA, PENNSYLVANIA.

IMPROVEMENT IN SEWING-MACHINES.

Specification forming part of Letters Patent No. 136,718, dated March 11, 1873.

*To all whom it may concern:*

Be it known that I, EBENEZER A. GOODES, of the city and county of Philadelphia and State of Pennsylvania, have invented new and useful Improvements in Sewing-Machines; and I do hereby declare the following to be a clear and exact description of the nature thereof sufficient to enable others skilled in the art to which my invention appertains to fully understand, make, and use the same, reference being had to the accompanying drawing making part of this specification, in which—

Figure 1 is a side view of the device illustrating my invention. Fig. 2 is a bottom view thereof. Figs. 3 to 13 are views of detached parts. The remaining figures represent various stitches produced.

Similar letters of reference indicate corresponding parts in the several figures.

This invention consists in peculiar mechanism for operating and controlling a bar carrying two or more needles, and rotating or not, as required, for the purpose of forming ornamental stitches, or for sewing two or more lines of stitches at one operation, with the upper threads interlocked by a single thread from below. It also consists in an improved take-up. It also consists in certain mechanism for automatically controlling the feed in forming angular stitching. It also consists in mechanism for controlling the feed by hand. It also consists in mechanism for adjusting the angle of the stitches.

Referring to the drawing, A represents the bed-plate; B, the stationary arm; C, the vibrating needle-arm; D, the pulley; and E E', cams on the driving-shaft D' for operating the needle-bar and shuttle, all of which parts may be of usual form and construction. F represents a rotating needle-bar, which moves in and is guided by bosses or heads $a$ of the stationary arm B. A feather, $b$, is formed on the bar F, and is designed to move at certain times in a groove or slot on the upper head or boss $a$, for purposes to be explained. Encircling the needle-bar below the feather is a cylinder, G, which has formed with it a cam-groove, $c$, (see Figs. 3, 4, 5, 6,) which extends downwardly around the cylinder to a point below its center, and continues upwardly around the same to the place of starting. From the upper head or boss $a$ of arm C there is suspended a piece, H, which extends in line with the needle-bar, and through its lower end is passed a screw-pin, J, which projects into the cam-groove of cylinder G and moves therein on the upward and downward motions of the needle-bar. A sleeve, K, encircles the cylinder G and rotates thereon. It is confined in place by means of a screw or pin, $d$, which passes through a slot, $e$, in the sleeve into the cylinder, so that the sleeve is permitted to rotate to a limited extent on the cylinder. The upper edge of the sleeve is cam faced or shaped, corresponding with the respective edges of the cam-groove of the cylinder, but so constructed that when one portion of the cam-edge of the cylinder and of the lower side of the cam-groove fit or register with each other, the other portion of the cam-edge will project somewhat above the other portion of the lower side of the groove, and the pin J rides on said cam-edge of the sleeve on the movements of the needle-bar. Two or more needles are employed, and may be secured to the needle-bar in any well-known manner. The needle-bar is attached to the vibrating arm C by means of a loose collar, L, encircling the needle-bar and retained in place thereon by the cam-cylinder above and pin and washer below, or in any other well-known manner, said collar being connected by screws $f$ to the piece L', whose stem slides in the arm C, whereby, when the machine is in motion, the needle-bar is properly reciprocated and the rotary motion thereof is not prevented or interfered with by the connection between the arm B and bar. Suppose the needle-bar to be down and sleeve K occupy the position shown in Fig. 5. As the bar rises it moves without rotation, owing to the feather $b$ being in its groove in the head $a$, and when the cam-groove $c$ reaches the pin J the feather is cleared of its groove, and the pin then enters said groove $c$ of the cylinder and causes the rotation of the bar to the right, at the same time riding over the sleeve which rotates with the cylinder. When the pin is in the lowest point of the cam-groove the needle-bar has reached its highest point (see Fig. 4) and made a half revolution. The ascending portion of the cam-groove has now reached the pin J and the bar descends; consequently the said bar continues its rotation and makes the full revolution. During this operation the pin arrives at the portion of the cam-edge of the sleeve which projects above the lower side of the cam-groove of the cylinder, and, bearing against said portion, causes it to move to the left so as to register with the cam-groove, this being completed on the full descent of the bar. The feather $b$ enters its groove in the head $a$ when the pin J has cleared the cylinder on the descent of the bar, and the needles then enter the fabric without rotation, the previous rotation of the bar crossing the threads and forming the braiding and embroidery stitches. (See Fig. 12.) The parts have now assumed position seen in Fig. 6. As the bar ascends the pin J enters the groove, the sleeve being in position, as in Fig. 6, and rotates the bar to the left, and continues the rotation, completing the same with the descent of the said bar, the sleeve being meanwhile moved to the right, and when the movement is completed the parts again assume the position shown in Fig. 5. It will be noticed that these two complete revolutions of the bar have been made in reverse order, and thus every two subsequent revolutions will be successively made. In other words, there is produced one complete rotary motion of the bar in one direction during one upward and downward movement of the needle-arm, and a similar motion in reverse order during the next upward and downward movements of the needle-arm, whereby the peculiar ornamental stitches are produced, as seen in Figs. 14, 16, 18, 19, and 20. When the rotary motion of the bar is not desired, then the pin J is withdrawn from the piece H, the feather $b$ brought in line with its guiding-groove in boss $a$, and a set-screw, $g$, fitted in the collar L, is tightened against the bar, whereby the latter will reciprocate vertically without rotation, as in ordinary sewing-machines. In this condition I am enabled to sew two lines of stitches, and the upper threads will be interlocked by a single thread from below. The take-up mechanism consists of an angular arm, M, hinged to the stationary arm B, to the shorter limb of which is pivoted, by a pin and slot, another arm, N, which is pivoted to said arm B, and has a cam-slot, $h$, extending the direction of its length. The long limb of the arm B projects longitudinally forward between the needle-bar and the presser-foot bar, and has one or more thread-guides in its outer end. The arm N receives an oscillating motion from a pin, $j$, (shown in dotted lines, Figs. 1, 4, and 6,) on the needle-arm C, working in the cam-slot $h$, and communicates motion to the arm M, so that the slack of the thread may be readily taken up in a reliable, quiet, and easy movement. To the end of the driving-shaft D', opposite to the pulley D, there is attached a shell, P, which is secured in place by a thumb or set screw, Q, passing through the front end of the shell and screwing into the center of the shaft D'. In order that the said shell may have a longitudinal sliding movement on the shaft, and likewise rotate with it, the shell is further connected to the shaft by means of a pin or feather, $k$, on the inner face of the shell entering a groove in the driving-shaft. (See Fig. 7.) The outer surface of the shell has formed with or secured to it a series of longitudinal teeth, R, which occupy a portion of said surface, and are of various lengths, the difference in the lengths being perceptible at the inner end of the shell. Beneath the bed-plate is secured a rotating disk or wheel, S, having on its under face a downwardly-projecting toothed rim, T, which teeth are adapted to gear with the teeth of the shell. Above the wheel, and secured to or formed with it, is a cam, U, and between this cam and the bed-plate A is located an arm, V, the arm, wheel, and cam having a common axis, $l$. (See Figs. 1 and 10.)

To the inner end of the arm V is attached a sliding piece, W, which is caused to bear against the cam U by a suitably-arranged spring, $m$. The piece W has a pin, $n$, at the end opposite to the cam, which pin enters a slot in and gives motion to an oscillating feed-bar guide, X, which consists of a forked or slotted piece, pivoted at one end to the under side of the bed-plate A, above the feed-bar Y, and is attached to the latter by the pin $n$, projecting into and playing in said guide X. When the arm V moves on its axis in one direction, it moves the pin of the sliding piece W further from the axis of the oscillating feed-bar guide, and thereby decreases the angle of said guide, and by turning the arm in the other direction the pin of the sliding piece is moved nearer to the axis of the guide, whereby the angle of the latter is increased the objects of which will be presently explained. The outer end of the regulating-arm V has a slot, through which and into the bed-plate passes a thumb-screw for securing the arm in position when regulated. The feed-bar Y has the well-known forward, backward, and vertical motions, but by means of the oscillating guide X also receives lateral motions. A graduated scale on the driving-shaft or other convenient place exhibits the position to be occupied by the shell P relatively to the desired or necessary adjustment thereof. The two throats for the needles have an open passage, $s$, between them to prevent the thread from the shuttle interlocking the loops from the needles around the metal forming the space between them. (See Fig. 13.)

The operation is as follows: Suppose the number of teeth on the shell P to be one-half of the number of teeth on the wheel S, and the shell to be moved by means of its thumb-screw Q until all the teeth on the shell are in gear with the wheel S. It will be seen that one revolution of the driving-shaft D', will give one half-revolution of the wheel S and cam U, which latter is equally divided, one-half being occupied by the longest throw and the other by the shortest throw; consequently, during the first revolution of the shaft and half revolution of the wheel S, the guide-piece X will remain as shown in Figs. 8 and 9, and the feed-bar will be moved forward and laterally to the left, and the stitch formed will be so inclined. At the next revolution of the shaft and half revolution of wheel S, the cam U will move the piece W and feed-bar guide X to the position shown by the dotted lines, Fig. 8, and the feed-bar will be moved forward and laterally to the right, the motions to the right and left alternating regularly as long as the parts are kept in gear for so doing, and the sewing formed will be a succession of stitches alternately inclined to the right and left, whether one, two, or more needles are used, and without any guiding whatever from the operator. Now, if the shell is moved to such position that but one of its teeth gears with wheel S, it is evident that it will require a number of revolutions of the main shaft to give a half revolution of wheel S, the number of revolutions depending on the number of teeth in the wheels. If the shaft makes eight revolutions in giving the wheel a half revolution, there will be eight stitches inclined to the right, and then the same number to the left.

Thus it will seen that a variety of changes in the appearance of the sewing may be made by merely throwing a greater or less number of teeth on the shell into gear with the wheel S, each change made requiring a different number of revolutions of the main shaft to give a half revolution of wheel S, each change consequently giving a different number of stitches to the angles of sewing.

The wheel S is prevented from being thrown further than moved by the teeth on the shell by means of a suitably-arranged spring.

A change can also be made in the angle of the sets of stitches by means of the regulating-arm V. By moving said arm on its pivot the pin $n$ on the sliding piece W may be placed nearer to or further from the center of the oscillating feed-bar guide, thereby increasing or diminishing the angle of its motion, and consequently that of the feed-bar.

Z represents an arm for operating the feed-controller by hand, or for securing the feed in position for plain sewing. The inner end of the arm is jointed to the sliding piece W, the arm being pivoted to the bed-plate at $p$. The other end of the arm has a slot, through which a thumb-screw, $q$, passes into the bed-plate for the purpose of securing the arm in position. The shell is run back or out until all of its teeth clear the teeth of wheel S, which then ceases to operate, when by means of the arm Z any inclination may be given to the feed-bar guide at pleasure; or, if straight sewing is required, the guide may be placed in the proper position and held securely by means of the screw $q$.

The feed-regulating device consists of a sliding piece, $Y'$, formed with the part of the feed-bar which is forced forward by the cam, as shown in Fig. 11, and attached to the feed-bar in any convenient manner, so that it may be moved back and forth, by a screw, $X'$, which, passing through the lug $W'$ on the feed-bar, is fitted to the sliding piece $Y'$. If, while the feed-bar is at rest, the sliding piece is moved by means of the screw $X'$ until the downwardly part $Z'$ of the piece touches the feed-cam at its smallest diameter, the feed-bar, by the revolution of the driving-shaft, will be moved forward the full throw of the cam, making the longest stitch; therefore, by moving the sliding piece forward or further from the cam, the size of stitch will be proportionately decreased, although the feed-bar will always return to the same point.

By removing either one of the needles the machine can be used as a regular lock-stitch machine for manufacturing or family use, and in either case the automatic feed-controller, from the regularity and precision of its operation, will be found extremely useful, alike in the saving of time and labor, beauty and correctness of work.

In the formation of a single row of plain stitches the operation of the needle and shuttle is similar to that of a class of machines technically known as the transverse-shuttle sewing-machines, the stitch formed being the well-known "lock-stich;" the shuttle being driven by an oscillating arm operated by a cam on the driving-shaft.

In all of the stitching where both needles are used, the shuttle passes through the loops from both needles at the same time or at each forward movement of the shuttle, and the stitches so formed are elastic lock-stitches, combining the strength and durability of the regular lock with the elasticity of the common chain-stitch.

Having thus described my invention, what I claim as new, and desire to secure by Letters Patent, is—

1. The needle-bar, rotating by means of the cam-cylinder G and engaging-pin J, substantially as described.

2. The mechanism for causing the reverse rotation of the needle-bar, consisting of the sliding sleeve K, in combination with the cam-cylinder G and pin J, substantially as set forth.

3. The swivel-collar L and its set-screw, as described, in combination with the removable pin J and cam-cylinder G, for controlling the needle-bar as to rotation.

4. The take-up mechanism, consisting of arms M N, constructed as described, in combination with the pin $j$ of the needle-arm, substantially as and for the purpose described.

5. Mechanism, substantially as herein described, for automatically controlling the feed movement for forming ornamental stitches.

6. The slide W, cam U, and oscillating guide X, in combination with the feed-bar, substantially as and for the purpose described.

7. The adjustable toothed shell P, substantially as described, in connection with the feed-bar and intermediate mechanism, for imparting variable motion to the feed-bar.

8. The shell P, having differential teeth R, substantially as and for the purpose described.

9. The lever Z, in combination with the slide W, cam U, guide X, and the feed-bar, substantially as described, for controlling the feed-movement by hand.

10. The lever V, in combination with the slide W, guide X, and laterally-yielding feed-bar, as described, for adjusting said slide to vary the extent of lateral inclination imparted through the guide X to the feed-bar.

The above signed by me this 17th day of June, 1872.

E. A. GOODES.

Witnesses:
　ED. L. MILLER,
　JOHN A. WIEDERSHEIM.